3,318,892
HYDROXY ALUMINUM NICOTINATE
ACETYLSALICYLATE
James M. Holbert, Lookout Mountain, Tenn., and Horst W. Schmank, Ringgold, Ga., assignors to Chattem Drug & Chemical Company, a corporation of Tennessee
No Drawing. Filed Sept. 11, 1964, Ser. No. 395,898
1 Claim. (Cl. 260—270)

The present invention relates to an improved organo-aluminum compound and to a method of preparation for this compound.

Specifically, the invention is concerned with the compound hydroxy aluminum nicotinate acetylsalicylate having the following structural formula:

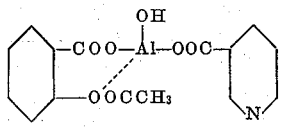

As evident from the foregoing structural formula, the compound with which the present invention is concerned contains two different physiologically active moieties attached to the same aluminum atom. The beneficial results obtained from the use of the compound apparently stem from the analgesic effect provided by the acetylsalicylate portion of the molecule, and the peripheral dilatation provided by the nicotinic acid portion. The compound is therefore useful in the treatment of conditions such as migraine headache, Meniere's syndrome, tension headache, and rheumatoid arthritis.

The preparation of the aforementioned compound in commercially acceptable yields requires special techniques to prevent the hydrolysis of the acetyl group or its ester exchange reaction resulting in the formation of acetate by-products. We have found that hydroxy aluminum nicotinate salicylate can be prepared in stable form and in substantial yields by control of the order of addition of ingredients, the time and temperature of reaction, and the concentration of water, thereby minimizing any side reactions which would result in deacetylation of the acetylsalicylic acid group.

It is accordingly an object of the present invention to provide an organo-aluminum compound having two physiologically active agents attached to the same aluminum atom.

Another object of the invention is to provide an improved organo-aluminum compound which has both analgesic and peripheral dilatation properties.

Still another object of the invention is to provide an improved method for the production of the compound hydroxy aluminum nicotinate acetylsalicylate wherein the amount of acetate split off is minimized.

Still another object of the invention is to provide a method for the production of the compound hydroxy aluminum nicotinate acetylsalicylate in stable form, in high yields.

In accordance with the present invention, the preferred method of producing the compound hydroxy aluminum nicotinate acetylsalicylate consists in providing an anhydrous alcoholic solution of nicotinic acid and an aluminum alcoholate in which the alcoholate groups each contain from 2 to 5 carbon atoms, then adding solid acetylsalicylic acid to the resulting solution while maintaining the temperature of the solution not in excess of 60° C., and thereafter adding water in an amount sufficient to precipitate a reaction product, followed by recovery of the resulting precipitate. The above method is preferred because it substantially minimizes the amount of acetate split off during the reaction. For example, when using aluminum isopropoxide as the alcoholate, and adding the acetylsalicyclic acid first, followed by the nicotinic acid, the formation of isopropyl acetate rises to approximately 1% or more. On the other hand, when the nicotinic acid is reacted first with the isopropoxide, followed by the aspirin, the isopropyl acetate in the mother liquors is reduced to values on the order of 0.1 to 0.3%.

In this connection, it is also important to keep the reaction temperature at not more than 60° C., since at temperatures in excess of that value, the amount of isopropyl acetate produced increases very rapidly.

It is also important to employ a minimal amount of water, just sufficient to precipitate the desired product completely. Specifically, it is desirable to use at least one molecular proportion of water to every molecular proportion of acetylsalicyclic acid, but not in excess of about 1.2 mols of water per mol of the acetylsalicylic acid. More preferably, the amount of water should not exceed about 1.1 molecular proportions for every molecular proportion of the acetylsalicylic acid.

To elaborate more completely, the preferred method of producing the compound consists in dissolving one molecular proportion of aluminum isopropoxide in anhydrous isopropanol at a temperature of about 30 to 35° C., followed by the addition of one molecular proportion of solid nicotinic acid gradually to the resulting solution while holding the temperature of the solution at least at about 68 to 70° C. Then, the resulting solution is cooled after the addition of the nicotinic acid until the solution has a temperature in the range from about 40 to 45° C. Following this, one molecular proportion of acetylsalicylic acid is added to the solution while maintaining the temperature of the solution not above 60° C., and preferably between 45 and 55° C. Then, the solution is cooled after the addition of the acetylsalicylic acid to a temperature of about 30° C. whereupon from 1 to 1.2 molecular proportions of water are added to this solution, resulting in a precipitate which can be recovered, washed, and dried to a stable form.

Other specific features involved in the preparation of this compound will be apparent from the following detailed example:

EXAMPLE

One mol of liquid aluminum isopropoxide (204 g.) was placed in a round bottom flask equipped with a condenser and stirrer, the isopropoxide being dissolved in approximately 400 ml. of anhydrous isopropanol. The temperature was maintained at about 30 to 35° C. One mol (123 g.) of powdered nicotinic acid was added with slow stirring. An exothermic reaction occurred as the nicotinic acid dissolved slowly. The temperature of the reaction was held at 68 to 70° C. for about 20 minutes to complete the reaction, resulting in the production of a slightly opalescent solution. This solution was cooled to 40 to 45° C. and then 1 mol (180 g.) of ground acetylsalicylic acid was added rather rapidly with stirring. The temperature was brought to 55° C., and care was exercised to avoid exceeding 60° C. This temperature was maintained for 15 minutes, resulting in a solution with increased opalescence. The solution was cooled to 30° C., and a mixture of 20 ml. of water (1.1 mols) dissolved in 275 ml. of anhydrous isopropanol were added at a moderate rate with stirring. Precipitation of the product occurred rapidly and after precipitation was complete, stirring was continued for approximately 40 minutes to 1 hour to produce a product which was readily filterable by suction. The filter product was sucked dry and washed with isopropanol and ether. The product was then dried in air to produce a yield of 346 to 348 grams. The air dried product appeared to stabilize itself, and apparently contained 1 mol of water of crystallization.

An analysis for aluminum and nitrogen was made, and the aluminum content was found to be 7.17%, and the nitrogen content 3.69%. The theoretical aluminum content for the compound hydroxy aluminum nicotinate acetylsalicylate is 7.44%, and the theoretical nitrogen content is 3.85%.

The infrared spectra of this compound taken on a spectrophotometer evidences a definite minima at wave lengths of about 6.2, 7.0, 8.4, and 13.1 microns. The corresponding wave numbers are about 1600, 1430, 1190, and 760 reciprocal centimeters.

Acute oral toxicity tests made in mice in a 14 day observation showed that the lethal dose for female mice is approximately 3.14 grams per kilogram, or about the same as it is for nicotinic acid itself.

The vasodilatory ability of the compound was tested in rabbits given doses of 25 milligrams per kilogram orally to two albino rabbits. The ear vessels of these rabbits were observed along with those of two untreated controls, and periodic flushing of the ear vessels of the treated rabbits was clearly visible to five observers.

In another test, the hydroxy aluminum nicotinate acetylsalicylate was suspended in a 1% tragacanth solution at a concentration of 25 milligrams per c.c., and doses of it were administered orally by rubber catheter to albino rabbits weighing 3 kilograms. On the day preceding the administration, the hair was clipped from the ears to permit better viewing. After the administration, the rabbits were placed in special rabbit boxes with their head and ears protruding. Two rabbits were given the compound at doses of 25 milligrams per kilogram body weight, and two rabbits served as the untreated controls. Within 10 minutes following administration of the compound, periodic flushing was seen in the ear vessels of the two rabbits receiving the compound. The flushing came on gradually, lasting 5, 10 or 15 seconds and subsided gradually to be followed by a period of non-flushing. The periodic flushing took place for 30 to 40 minutes and gradually diminished in intensity.

The composition of the present invention may be used in ruminant feeds where it provides a convenient source of nicotinic acid.

It should be evident that various modifications can be made to the described embodiments without departing from the scope of the present invention.

We claim as our invention:

The compound hydroxy aluminum nicotinate acetylsalicylate.

References Cited by the Examiner
UNITED STATES PATENTS

| | | | |
|---|---|---|---|
| 2,844,551 | 7/1958 | Orthner et al. | 260—270 X |
| 3,100,787 | 8/1963 | Staib | 167—65 |

OTHER REFERENCES

Wilson et al., "American Drug Index" Lippincott, 1963, pp. 28 and 29 relied upon.

ALEX MAZEL, *Primary Examiner.*

HENRY R. JILES, *Examiner.*

DONALD G. DAUS, *Assistant Examiner.*